(12) United States Patent
Hashimoto et al.

(10) Patent No.: US 7,172,810 B2
(45) Date of Patent: Feb. 6, 2007

(54) RESIN COMPOSITIONS, MONOFILAMENTS, PROCESS FOR PRODUCING THE SAME AND FISHING LINES

(75) Inventors: Satoshi Hashimoto, Ibaraki (JP); Shingo Taniguchi, Ibaraki (JP); Yasuhiro Tada, Ibaraki (JP); Masayuki Hino, Ibaraki (JP); Masaru Satou, Ibaraki (JP); Takeo Takahashi, Ibaraki (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/470,838

(22) PCT Filed: Jan. 30, 2002

(86) PCT No.: PCT/JP02/00731

§ 371 (c)(1),
(2), (4) Date: Jul. 30, 2003

(87) PCT Pub. No.: WO02/064867

PCT Pub. Date: Aug. 22, 2002

(65) Prior Publication Data

US 2004/0076825 A1  Apr. 22, 2004

(30) Foreign Application Priority Data

Jan. 31, 2001 (JP) ............................. 2001-024200

(51) Int. Cl.
*D01F 6/00* (2006.01)
*C08F 25/00* (2006.01)

(52) U.S. Cl. .................. 428/364; 428/394; 525/254; 525/255

(58) Field of Classification Search .......... 428/364, 428/394; 43/44.98; 526/276; 264/291; 525/255, 254
See application file for complete search history.

(56) References Cited

U.S. PATENT DOCUMENTS 4,564,013 A   1/1986  Lilenfeld et al.
5,093,427 A * 3/1992  Barber ................... 525/276
5,658,663 A   8/1997  Mizuno et al.
6,132,869 A * 10/2000 Ohira et al. .............. 428/364
6,677,416 B2 * 1/2004 Sato et al. ................ 526/255

FOREIGN PATENT DOCUMENTS

| EP | 0751157 A1 | 1/1997 |
| EP | 0913087 A1 | 5/1999 |
| GB | 2095166 A | 9/1982 |
| JP | 54-106622 | 8/1979 |
| JP | 56-020610 | 2/1981 |
| JP | 01-201515 | 8/1989 |
| JP | 5-33059 | 5/1993 |
| JP | 06-101114 | 4/1994 |
| JP | 07-216635 | 8/1995 |
| JP | 07-292519 | 11/1995 |
| JP | 10-292226 | 11/1998 |
| JP | 10-292227 | 11/1998 |
| JP | 10-298825 | 11/1998 |
| JP | 11-279225 | 10/1999 |
| JP | 2000-192327 | 7/2000 |
| WO | WO98/48087 | 10/1998 |

OTHER PUBLICATIONS

First Office Action dated Feb. 25, 2005, CN Patent Application No. 02804414.2
Office Action dated Mar. 12, 2003 from corresponding Taiwanese Patent Application No. 91101538 (English Translation enclosed).

* cited by examiner

*Primary Examiner*—N. Edwards
(74) *Attorney, Agent, or Firm*—Beyer Weaver & Thomas, LLP

(57) ABSTRACT

Monofilaments comprising resin compositions which contain 1% by mass or more of a comonomer component (for example, hexafluoropropylene), have an intrinsic viscosity of 1.3 dl/g or more and a melting point of 165° C. or higher and contain a PVDF-based resin. Owing to the above composition and physical properties, the crystallinity and elastic modulus of the PVDF-based resin are altered. As a result, an appropriate flexibility can be imparted to the monofilaments while preventing deterioration in the mechanical properties.

10 Claims, No Drawings

RESIN COMPOSITIONS, MONOFILAMENTS, PROCESS FOR PRODUCING THE SAME AND FISHING LINES

TECHNICAL FIELD

The present invention relates to a resin composition, a monofilament, a method of making the same, and a fishing line; and, in particular, to a resin composition including a vinylidene fluoride-based resin, a monofilament comprising the resin composition, a method of making the monofilament, and a fishing line using the monofilament.

BACKGROUND ART

Vinylidene fluoride (hereinafter referred to as "PVDF") based (PVDF type) monofilaments have various excellent characteristics and have preferably been in use for fishing lines, such as guts specifically typified by leaders, from the following viewpoint in particular:

Namely, while being excellent in toughness, shock resistance, abrasion resistance, sensitivity (bite detectability), light resistance, and the like, PVDF-based monofilaments have a high specific gravity (1.79), so that they are easy to sink in water. Also, they have a refractive index (1.42) close to that of water (1.33), so that they exhibit less surface reflection in water, whereby they appear transparent and are hard to see. Further, they hardly absorb water and thus can maintain their various characteristics for a long period of time even in water.

They are in use not only for guts, but also for lure lines, main lines for cast fishing, trunk lines for boat fishing, and the like for their high shock resistance, high specific gravity, high sensitivity, and the like.

However, because of their high crystallinity and elasticity modulus, the PVDF-based monofilaments are inherently more likely to kink when wound about a reel as compared with nylon which is generally in use as a fishing line.

It has also been noted that PVDF-based monofilaments are likely to uncoil from a reel when used as a fishing line having a large diameter. They are hard to handle in this case. Therefore, PVDF-based monofilaments further excellent in suitability for reeling have been in demand for lure lines and main lines in particular.

For eliminating such disadvantages, various methods have been tried in order to soften PVDF-based monofilaments. Known as specific examples are:

(1) methods adding a large amount of acrylic resins and polyester type plasticizers (see, for example, commonly assigned Japanese Patent Application Laid-Open No. SHO 54-106622, Japanese Examined Patent Application Publication No. SHO 60-17845 (Japanese Patent No. 1297193), Japanese Patent No. 2566871, and the like);

(2) methods using copolymers (see, for example, Japanese Examined Patent Application Publication No. HEI 5-33059, commonly assigned Japanese Patent No. 2571538, and the like);

(3) methods lowering the draw ratio (see, for example, commonly assigned Japanese Patent Application Laid-Open No. HEI 10-298825);

(4) methods with heavy relaxation heat treatment; and the like.

DISCLOSURE OF THE INVENTION

However, the inventor studied the PVDF-based monofilaments obtained by the above-mentioned conventional methods in detail, and have found the following problems. Namely, it has been found:

(1) When acrylic resins and polyester type plasticizers are added by a large amount, monofilaments tend to lower their strength remarkably. Also, there are cases where added plasticizers bleed, so that the filament surface appears to be powdered white.

(2) It is hard to obtain a monofilament having both high knot strength and softness when copolymers are used simply.

(3) Monofilaments tend to fail to improve their knot strength sufficiently when drawn under a low draw ratio condition.

(4) Strength remarkably decreases when relaxation heat treatment is carried out in excess.

Thus, the conventional methods failed to yield fully satisfactory PVDF-based monofilaments which are soft but hard to kink upon winding, while maintaining their inherent excellent characteristics.

It is therefore an object of the present invention to provide a resin composition for a monofilament which is better in softness and harder to kink upon reeling as compared with conventional ones, while keeping various excellent characteristics of a PVDF-based monofilament, and can improve suitability for reeling; a monofilament using this resin composition, a method of making the same, and a fishing line.

For solving the above-mentioned problem, the inventor conducted diligent studies, made monofilaments while variously changing compositions of ingredients constituting the monofilaments, physical properties of their materials, and the like, and tested and evaluated indices of their mechanical characteristics, softness, and kink upon winding, thereby finding quite effective compositions and properties, by which the present invention has been accomplished.

Namely, the resin composition in accordance with the present invention comprises a vinylidene fluoride-based resin, includes at least 1% by mass, preferably 1% to 10% by mass, more preferably 1.5% to 5% by mass of a comonomer component, and has an intrinsic viscosity of at least 1.3 dl/g, preferably 1.3 to 2.0 dl/g, more preferably 1.3 to 1.7 dl/g, and a melting point of at least 165° C.

The resin composition is particularly suitable for a monofilament for fishing lines and the like as will be explained later, but is not restricted to such a use.

The monofilament in accordance with the present invention comprises the resin composition of the present invention, has a composition and property specific to the resin composition, and exhibits its characteristics. More preferably, it comprises the above-mentioned resin composition, i.e., comprises a vinylidene fluoride-based resin, includes at least 1% by mass, preferably 1% to 10% by mass, more preferably 1.5% to 5% by mass of a comonomer component, and has an intrinsic viscosity of at least 1.3 dl/g, preferably 1.3 to 2.0 dl/g, more preferably 1.3 to 1.7 dl/g, and a melting point of at least 165° C.

Using thus configured resin composition or monofilament not only achieves a knot strength/elongation sufficient for a fishing line, for example, but also exhibits a desirable suitable degree of bend elastic constant. It has also been verified that kinks are alleviated, whereby "uncoiling" can be prevented from occurring when the line is wound about a reel.

Though details of a mechanism causing such an improvement in characteristics have not yet been clear, it is presumed to be because of a fact that, for example, the comonomer introduced into the PVDF-based resin not only exhibits a plasticizer effect, but also causes a structural change in a crystal unit of the PVDF-based resin, and further influences the distribution characteristic of its amorphous and crystal parts.

If the comonomer component content in the resin composition is less than 1% here, the bend elastic constant will be so high that it will be hard to soften the monofilament sufficiently. In this case, when wound as a main line about a reel, the problem of uncoiling from the reel will be likely to occur since the elasticity and repulsive force of the monofilament are high.

This seems to be because of the fact that the content (ratio) of the comonomer component is too low for the crystallinity and elasticity of a matrix made of the PVDF-based resin to be sufficiently relaxed/lowered. However, operations are not limited thereto.

The comonomer component content of 10% or less is advantageous in that it can fully restrain the composition from becoming too soft and its elongation from increasing disadvantageously.

If the intrinsic viscosity of the resin composition is less than 1.3 dl/g and the melting point is lower than 165° C., a sufficient knot strength/elongation cannot be obtained, whereby a PVDF-based monofilament is hard to act as a monofilament for a fishing line. In particular, a sufficient knot strength is less likely to be exhibited sufficiently when the intrinsic viscosity is less than 1.3 dl/g. When the melting point is lower than 165° C., not only a knot strength is less likely to be exhibited sufficiently, but also the composition tends to become too soft to be used.

It will be favorable if the comonomer component is derived from an alkene having a carbon number of 2 to 10 with at least one hydrogen atom substituted by a fluorine atom, preferably hexafluoropropylene. Since such an alkene or alkene derivative has an excellent compatibility with a PVDF-based resin, the copolymer as the PVDF-based resin can homogenize its structural strength.

In particular, using hexafluoropropylene is advantageous in that its molecular structure is so bulky that its intramolecular plasticizing effect is strong at the time of copolymerization in particular, whereby a small amount of copolymerization can keep a strength level, lower the crystallinity, and decrease the elastic constant, so as to soften the composition.

If the carbon number in the comonomer component exceeds 10, its compatibility or dispersibility with the PVDF-based resin will tend to decrease disadvantageously, thereby lowering the knot strength. Also, lines may be cut at the time of making, or may fail to act as a monofilament.

Preferably, the monofilament of the present invention satisfies the relationships represented by the following expressions (1) and (2):

$$F \geq (37/d)^{1/3.5} \tag{1}$$

$$E \leq (700/d)^{1/3.5} \tag{2}$$

where F is the knot strength (GPa) of the monofilament, E is the bend elastic constant (GPa) of the monofilament, and d is the diameter (μm) of the monofilament.

If the knot strength F is lower than $(37/d)^{1/3.5}$ shown in the right side of expression (1), the toughness of the monofilament used as a fishing line for a lure line or main line will be less likely to be secured. If its bend elastic constant E exceeds $(700/d)^{1/3.5}$ shown in the right side of expression (2), on the other hand, the hardness of the monofilament will tend to increase so much that it becomes disadvantageous in terms of handling.

Though the monofilament in accordance with the present invention may comprise either a single layer or two or more layers, it will be preferred if the monofilament is provided with a longitudinally extending core part and a sheath part, disposed about the core part, comprising at least one layer.

Conventionally known as methods for improving the knot strength of a PVDF-based monofilament are those using a multilayer structure (e.g., three-layer structure) of a copolymer (see, for example, Japanese Patent Publication No. 2941176 and the like), and those using core and sheath materials having respective melting points different from each other (see, for example, Japanese Patent Application Laid-Open Nos. HEI 10-292226 and HEI 10-292227 and the like).

However, according to the knowledge of the inventors, a simple three-layer structure complicates nozzles and the like of manufacturing apparatus and tends to increase the complexity of the manufacturing process. Also, the strength did not tend to improve remarkably in proportion thereto. When the difference between the respective melting points of core and sheath materials was too large, on the other hand, there were cases where the strength decreased on the contrary.

More specifically, when the temperature at the time of drawing upon heating was set to the optimal drawing temperature of the sheath material at which the latter was sufficiently heated in the case where the melting point of the sheath material polymer was made higher than that of the core material polymer by 5° C. or more, the temperature exceeded the optimal drawing temperature for the core material, thereby deteriorating the orientation of the core material, and melting crystals in some cases.

When the temperature at the time of drawing upon heating was set to the optimal drawing temperature for the sheath material in the case where the melting point of the sheath material polymer was made lower than that of the core material polymer by 5° C. or more, by contrast, the core material on the inner side was not heated sufficiently. Raising the temperature at the time of drawing upon heating to the maximum drawing temperature for the core material, on the other hand, was problematic in that the sheath material melted.

By contrast, the monofilament in accordance with the present invention reliably achieves a high knot strength upon multilayering. Here, it will be preferred if the difference between the melting point of the core part and that of the sheath part is less than 5° C., preferably 3° C. or less, since a high knot strength can be exhibited thereby.

The method of making a monofilament in accordance with the present invention is a method of effectively making the monofilament of the present invention, the method comprising (a) a preparing step of preparing a resin composition (resin composition of the present invention) including a vinylidene fluoride-based resin comprising a comonomer component such that the comonomer component has a content of at least 1% by mass in the monofilament, and the monofilament has an intrinsic viscosity of at least 1.3 dl/g and a melting point of at least 165° C.; and (b) a drawing step of spinning the resin composition at a predetermined extrusion temperature and then drawing thus spun resin composition at a temperature lower than the melting point of the resin composition by 5° C. to 15° C.

The drawing step may be either single-stage drawing or multistage drawing of two or more stages. In the case of multistage drawing, it will be preferred if the drawing temperature in the first stage of drawing is lower than the melting point of the resin composition by 5° C. to 15° C. The fishing line in accordance with the present invention is one including the resin composition of the present invention, i.e., one comprising the monofilament.

BEST MODE FOR CARRYING OUT THE INVENTION

In the following, preferred embodiments of the present invention will be explained in detail. The monofilament in accordance with the present invention is made from a resin composition mainly composed of a PVDF-based resin. For example, this PVDF-based resin is a copolymer, mainly composed of a vinylidene fluoride monopolymer or a copolymer mainly composed of vinylidene fluoride, comprising as a comonomer component an alkene derivative having a carbon number of 2 to 10 with at least one hydrogen atom substituted by a fluorine atom, more specifically a derivative of tetrafluoroethylene, hexafluoropropylene, trifluoroethylene, trifluorochloroethylene, vinyl fluoride, or the like.

They may be used one by one or in combination of two or more. Among them, hexafluoropropylene is preferable in particular. That is, the comonomer component in the resin is preferably hexafluoropropylene in particular.

Structurally, the monofilament containing the resin composition of the present invention may comprise either a single layer or two or more layers. Preferred as such a configuration is, for example, one comprising a longitudinally extending core material (core part) and a sheath material (sheath part) comprising at least one layer disposed about the core material.

When the monofilament has such a multilayer structure, it is not necessary for the whole structure (all the constituent layers) to be made of the above-mentioned resin including a comonomer component. For example, it will be sufficient if the comonomer component is at least 1% by mass, preferably 1% to 10% by mass, with respect to the total amount of the monofilament. When the monofilament comprises the core and sheath materials, the resin including a comonomer may be used in any of them. However, from the viewpoint of fully enhancing the mechanical strength of the monofilament such as knot strength, it will be preferred if the resin is used in the core material. In this case, a PVDF resin including no comonomer component may be allocated to the sheath material.

Above-mentioned monofilament of the present invention has an intrinsic viscosity (inherent viscosity: $\eta_{inh}$) of at least 1.3 dl/g, preferably within the range of 1.3 to 2.0 dl/g, more preferably 1.3 to 1.7 dl/g.

In addition, the melting point of the monofilament is at least 165° C. For example, when the monofilament has a multiple structure of a core material and a sheath material, taking the main melting peak temperature measured as it is as a melting point, the melting point is set to 165° C. or higher. In the case of a core/sheath double structure, it is desirable that the difference between the respective melting points of the core and sheath materials be preferably less than 5° C., or more preferably less than 3° C. in particular.

The PVDF-based resin, which is the main material of the monofilament of the present invention, may be mixed with polyester type plasticizers, phthalate ester-based plasticizers, nucleating agents typified by flavanthrone, and other resin components having favorable compatibility with the PVDF-based resin within ranges not deteriorating its properties. In particular, polyester having a molecular weight of 1500 to 4000, a repeating unit composition made of an ester made from a dialcohol having a carbon number of 2 to 4 and a dicarboxylic acid having a carbon number of 4 to 6, and a terminal group made of a univalent acid having a carbon number of 1 to 3 or a univalent alcohol residue is preferably used as a plasticizer.

It will also be preferred if the monofilament of the present invention further contains a colorant such as a dye. Coloring dyes and the like used for coloring monofilaments in general can be employed as the colorant. Using a fluorescent dye is favorable in that visibility can be improved thereby depending on purposes from the viewpoint of exhibited color tones and the like.

In such a monofilament of the present invention, it is presumed that the comonomer introduced in the PVDF-based resin exhibits a plasticizer effect, and the comonomer component generates a structural change in a crystal unit of PVDF, which is the main ingredient, and/or changes a distribution characteristic of its amorphous and crystal parts, thereby appropriately relaxing its high crystallinity and high elasticity. However, operations are not limited thereto.

Such an operation can achieve a very high knot strength and an appropriate knot elongation, such as those required for a fishing line, yield a desirable favorable degree of bend elastic constant, alleviate kinks in the line, and prevent the line from uncoiling when wound about a reel.

Therefore, while keeping various characteristics of the monofilament containing the PVDF-based resin, such as excellent mechanical characteristics thereof, from deteriorating, conventional problems such as entanglement with the tip top of a rod due to a winding kink in the line wound about a reel can be eliminated. Also, when used as a thicker fishing line, no complicated line handling due to uncoiling from the reel is necessary, and rod and line manipulations such as those upon hooking fish can be carried out smoothly.

Since the comonomer component content is 1% or greater, the bend elastic constant can be prevented from becoming too high. Therefore, an appropriate softness can be imparted to the monofilament. It can also prevent the line from twisting because of its winding kink and thereby getting entangled. Hence, when it is used for a fishing line, fish can be controlled sufficiently in a desirable manner.

A mechanism for yielding such an operation is presumed to result from a fact that the comonomer component content (ratio) is in short, whereby the matrix containing the PVDF-based resin does not sufficiently relax/lower its crystallinity and elasticity. However, operations are not be restricted thereto.

When the comonomer component content is 10% or less, the monofilament can be prevented from becoming too soft. In addition, it can fully prevent elongation from increasing disadvantageously.

Since it has an intrinsic viscosity of at least 1.3 dl/g and a melting point of at least 165° C., a sufficient knot strength/elongation is achieved, whereby a monofilament quite suitable for a fishing line is obtained. In particular, the intrinsic viscosity of at least 1.3 dl/g can achieve a sufficient knot strength. Further, the melting point of at least 165° C. can reliably prevent knot strength from being exhibited insufficiently, and keep the monofilament from becoming too soft to be used.

Using an alkene derivative having a carbon number of 2 to 10 with at least one hydrogen atom substituted by a fluorine atom as a comonomer makes the comonomer component have a carbon number of 10 or less, thereby sufficiently restraining the compatibility or dispersibility with the PVDF-based resin from decreasing. This can prevent disadvantages, such as the decrease in knot strength and the line cutting at the time of manufacture, from occurring.

Using hexafluoropropylene as the comonomer component in the resin is advantageous in that its molecular structure is so bulky that its intramolecular plasticizing effect is strong, whereby a small amount of its addition can keep a strength level, lower the crystallinity, and decrease the elastic constant, so as to soften the monofilament.

The monofilament having a multiple structure (multilayer structure) comprising a core material, a sheath material, and the like makes it easier to achieve a high knot strength. In this case, a higher knot strength can be exhibited if the difference between the respective melting points of the core and sheath parts is less than 5° C.

An example of method of making the monofilament of the present invention will now be explained.

First, a PVDF-based resin comprising at least 1% by mass of hexafluoropolypropylene, for example, as a comonomer component is prepared. As a method of its preparation, a copolymerizing method usually in use can be employed. Further, if necessary, other resins (e.g., other PVDF-based resins such as PVDF resin) are mixed with the PVDF-based resin such that the resulting monofilament has an intrinsic viscosity of at least 1.3 dl/g and a melting point of at least 165° C.

As a method of mixing them, they may be either mixed simply or formed into a powder-like dry blend product. Further, methods forming a pellet blend or master batch and the like can be used when appropriate. Known methods can be used as a preparing procedure at that time. Here, various kinds of additives such as UV absorbers, light stabilizers, heat stabilizers, antioxidants, and colorants may be added within ranges not inhibiting the above-mentioned effects of the present invention (preparing step).

Thus obtained resin composition, e.g., powder or pellet, is put into an extruder, extruded at an extrusion temperature preferably set to 220° C. to 320° C., and rapidly cooled in water or the like at 30° C. to 80° C. Thus cooled product is then drawn to a ratio within the range of 4 to 7 in a heating medium such as glycerin. Here, the drawing temperature is lower than the melting point of the resin composition by 5° C. to 15° C. (drawing step). The drawing may be either single-stage drawing or multistage drawing. In the case of multistage drawing, it will be preferred if the drawing temperature in the first stage of drawing is lower than the melting point of the resin composition by 5° C. to 15° C. with a draw ratio within the range of 4 to 7.

The temperature range of 5° C. to 15° C. can yield optimally oriented crystallization, thereby achieving a sufficient knot strength. Thereafter, relaxation processing at 2% to 12% is carried out in hot water of 70° C. to 98° C., for example, so as to yield the monofilament of the present invention. Though not restricted in particular, this monofilament usually has a diameter in the order of 50 μm to 2.5 mm.

Such a manufacturing method can effectively make the monofilament of the present invention.

Preferably, the monofilament of the present invention satisfies the relationships represented by the following expressions (1) and (2):

$$F \geq (37/d)^{1/3.5} \qquad (1)$$

$$E \leq (700/d)^{1/3.5} \qquad (2)$$

where F is the knot strength (GPa) of the monofilament, E is the bend elastic constant (GPa) of the monofilament, and d is the diameter (μm) of the monofilament.

If the knot strength F is at least $(37/d)^{1/3.5}$ shown in the right side of expression (1), the toughness of the monofilament used as a fishing line for a lure line or main line can be secured sufficiently. If its bend elastic constant E is not greater than $(700/d)^{1/3.5}$ shown in the right side of expression (2), on the other hand, an appropriate softness can be imparted to the monofilament, whereby its handling can further be improved.

As long as the above-mentioned characteristic resin composition is used, the purpose/mode of the present invention is not limited to a monofilament, but is suitable as other filament members, net-like members, filament complexes, and the like. As a material resin of the resin composition of the present invention and PVDF-based monofilament, a blend of a plurality of kinds of polymers (polymer blend) may also be used. The mode of polymers is not limited, examples of which include homopolymers and copolymers.

EXAMPLES

Specific examples of the present invention will now be explained, although the present invention is not restricted thereto. In the following prescriptions, "part" always refers to "part by mass".

Used Material

Table 1 shows used material resins and their physical properties.

TABLE 1

| Resin | | Inherent viscosity $\eta_{inh}$/dl/g | Comonomer content/% by mass | Comonomer component | MP/° C. |
|---|---|---|---|---|---|
| (1) Homopolymer A | Made by | 1.1 | 0 | — | 176 |
| (2) Homopolymer B | Kureha | 1.3 | 0 | — | 176 |
| (3) Homopolymer C | Chemical | 1.5 | 0 | — | 175 |
| (4) Homopolymer D | Industry | 1.7 | 0 | — | 173 |
| (5) Copolymer a | Co., Ltd. | 1.45 | 6.1 | Hexafluoro- | 161 |
| (6) Copolymer b | | 1.48 | 3.8 | propylene | 167 |
| (7) Copolymer c | | 1.0 | 9.5 | | 150 |
| (8) Kyner 460 | Made by Atofina Japan KK | 0.84 | 0 | — | 165 |

Measurement Test 1: Melting Point

The main melting peak temperature $T_{pm}$ of each resin measured in an $N_2$ atmosphere at a heating rate of 10° C./min in conformity to the DSC (differential scanning calorimeter) method described in JIS K 7121 by using DSC7 manufactured by Perkin Elmer, Inc. was taken as a melting point. When two or more melting peaks appeared independently, one having a greater peak area was taken as the main melting peak.

For measuring the melting point inherent in each resin while omitting fibrous structure factors formed by drawing and the like, temperature was raised until crystals were once completely melted ($1^{st}$ run), subsequently lowered at the same rate to room temperature so as to effect crystallization, and then raised until the crystals were completely melted again, whereby thus obtained value of "$2^{nd}$ run" was employed in the measurement. When two or more melting peaks appeared independently in cases where a melting point of a complex system was measured as it was and the like, their main melting peak temperature was taken as the melting point.

Measurement Test 2: Comonomer Content

Using $^{19}$F-NMR (nuclear magnetic resonance), the amount of comonomer component in each monofilament was measured. Specifically, $^{19}$F spectral measurement was carried out at a frequency of 500 MHz by using a UNITY INOVA 500 NMR spectrometer manufactured by Varian, Inc.

In this case, each resin measurement sample was dissolved in N,N-Dimethylformamide, so as to prepare a sample solution, which was then set in the above-mentioned NMR spectrometer. Its resulting signals in the vicinity of 69 to 75 ppm were taken as those derived from $CF_3$, whereas signals in the vicinity of 91 to 119 ppm were taken as those derived from $CF_2$. From the total of respective integrated values of signal intensities in the individual regions and the molecular weight ratio of hexafluoropropylene/vinylidene fluoride, the content of hexafluoropolypropylene (content ratio: % by mass) was determined.

Measurement Test 3: Intrinsic Viscosity (Inherent Viscosity $\eta_{inh}$)

Each monofilament sample was dissolved by a concentration of 0.4 g/dl in N,N-Dimethylformamide, and the intrinsic viscosity of this solution at 30° C. was measured by an Ubbelohde viscometer.

Measurement Test 4: Knot-Pull Strength/Elongation

A knot was formed at the center part of a single string of each monofilament, which was then used as a measurement sample. This measurement sample was set in a Strograph RII tensile tester manufactured by Toyo Seiki Seisaku-sho, Ltd., and its knot strength and knot elongation were measured with a test length of 300 mm, a pulling rate of 300 mm/min, and a measurement number of n=5 in a room at 23° C., 65RH %.

Measurement Test 4: Bend Elastic Constant

Using a Strograph RII tensile tester manufactured by Toyo Seiki Seisaku-sho, Ltd., a bending test was carried out in a room at 23° C., 65RH %.

First, each monofilament sample was perpendicularly mounted on two stainless rods, each having a diameter of 1.3 mm, disposed in parallel with a gap of 5 mm therebetween, and a hook having a diameter of 0.8 mm is attached to the center part of the sample. Subsequently, from the maximum point load obtained when the sample was perpendicularly pulled out from between the two stainless rods at a pulling rate of 5 mm/min and the amount of deflection at that time, a bend elastic constant as an index of hardness of the monofilament was measured. Here, the measurement number n=5.

Measurement Test 5: Line Kink Index

About 50 m of each monofilament were taken up by a spool having a winding drum diameter of 44 mm, and the spool with the monofilament was left for 7 days in an oven heated to 40° C. Thereafter, at room temperature, the monofilament was drawn from the spool by 1 m, and its naturally hanging length was measured. The value obtained when thus measured length was divided by the drawn length (1 m) of monofilament was taken as a line kink index as an index of resistance to kink upon winding.

Measurement Test 6: Reel Uncoiling Test

About 100 m of each monofilament were rewound about a Biomaster #1000 reel manufactured by Shimano, Inc. Next day, a long cast test was carried out. The state of uncoiling from the reel was visually inspected, and 5-grade evaluation was carried out, in which those with severe uncoiling were evaluated as "1" whereas those with substantially no uncoiling were evaluated as "5".

Example 1

As a material resin for the PVDF-based monofilament, the PVDF-based resin of the above-mentioned (6) (copolymer b) was used. This composition was spun at an extrusion temperature of 230° C. to 310° C. by using an extruder having a diameter of 35 mm (a nozzle with 12 holes each having a diameter of 1.5 mm), subsequently quenched (rapidly cooled) in water at a cooling temperature of 60° C., and then drawn to a ratio of 6.0 in a glycerin bath at 157° C., so as to yield a monofilament having a diameter of 0.30 mm.

Example 2

A monofilament having a diameter of 0.30 mm was obtained in the same manner as with Example 1 except that a resin composition in which the PVDF-based resins of the above-mentioned (3) (homopolymer C) and (5) (copolymer a) were blended at a mass ratio of (3)/(5)=1/1 was used as a material resin of the PVDF-based monofilament.

Example 3

A monofilament having a diameter of 0.30 mm was obtained in the same manner as with Example 1 except that a resin composition in which the PVDF-based resins of the above-mentioned (4) (homopolymer D) and (5) (copolymer a) were blended at a mass ratio of (4)/(5)=1/1 was used as a material resin of the PVDF-based monofilament and drawn to a ratio of 6.2 in a glycerin bath at 161° C.

Example 4

A monofilament having a diameter of 0.30 mm was obtained in the same manner as with Example 1 except that a resin composition in which the PVDF-based resins of the above-mentioned (4) (homopolymer D) and (5) (copolymer a) were blended at a mass ratio of (4)/(5)=2/1 was used as a material resin of the PVDF-based monofilament and drawn to a ratio of 6.0 in a glycerin bath at 165° C.

Example 5

A monofilament having a diameter of 0.30 mm was obtained in the same manner as with Example 1 except that a resin composition in which the PVDF-based resins of the above-mentioned (4) (homopolymer D) and (6) (copolymer b) were blended at a mass ratio of (4)/(6)=1/1 was used as a material resin of the PVDF-based monofilament and drawn to a ratio of 6.2 in a glycerin bath at 161° C.

Example 6

A resin composition in which the PVDF-based resins of the above-mentioned (4) (homopolymer D) and (5) (copolymer a) were blended at a mass ratio of (4)/(5)=2/1 was used as a core material, whereas a resin composition in which the PVDF-based resins of the above-mentioned (2) (homopolymer B) and (8) (Kynar 460) were blended at a mass ratio of (2)/(8)=4/1 was used as a sheath material. Using two extruders each having a diameter of 35 mm (a complex nozzle with 12 holes each having a diameter of 1.5 mm), they were spun at a complex ratio of core material/sheath material=82/18 and an extrusion temperature of 240° C. to 310° C.

Thereafter, thus obtained product was quenched (rapidly cooled) in water at a cooling temperature of 60° C., and then was drawn to a ratio of 6.1 in a glycerin bath at 163° C. Subsequently, it was drawn to a ratio of 1.08 in a glycerin bath at 169° C., and then relaxed to a ratio of 0.93 in hot water at 87° C., so as to yield a monofilament having a diameter of 0.30 mm.

Example 7

A monofilament having a diameter of 0.30 mm was obtained in the same manner as with Example 6 except that a resin composition in which the PVDF-based resins of the above-mentioned (2) (homopolymer B) and (8) (Kynar 460) were blended at a mass ratio of (2)/(8)=3/2 was used as a sheath material.

Example 8

A monofilament having a diameter of 0.30 mm was obtained in the same manner as with Example 6 except that a resin composition in which the PVDF-based resins of the above-mentioned (4) (homopolymer D) and (5) (copolymer a) were blended at a mass ratio of (4)/(5)=1/1 was used as a core material, and that a resin composition in which the PVDF-based resins of the above-mentioned (2) (homopolymer B) and (8) (Kynar 460) were blended at a mass ratio of (2)/(8)=2/3 was used as a sheath material.

Example 9

A resin composition in which the PVDF-based resins of the above-mentioned (3) (homopolymer C) and (5) (copolymer a) were blended at a mass ratio of (3)/(5)=2/1 was used as a core material, whereas a resin composition in which the PVDF-based resins of the above-mentioned (1) (homopolymer A) and (8) (Kynar 460) were blended at a mass ratio of (1)/(8)=3/2 was used as a sheath material. Using two extruders each having a diameter of 35 mm (a complex nozzle with 36 holes each having a diameter of 1.0 mm), they were spun at a complex ratio of core material/sheath material=75/25 and an extrusion temperature of 230° C. to 290° C.

Thereafter, thus obtained product was quenched (rapidly cooled) in water at a cooling temperature of 40° C., and then was drawn to a ratio of 5.9 in a glycerin bath at 163° C. Subsequently, it was drawn to a ratio of 1.12 in a glycerin bath at 169° C., and then relaxed to a ratio of 0.91 in hot water at 87° C., so as to yield a thin monofilament having a diameter of 0.12 mm.

Example 10

A resin composition in which the PVDF-based resins of the above-mentioned (4) (homopolymer D) and (5) (copolymer a) were blended at a mass ratio of (4)/(5)=2/1 was used as a core material, whereas a resin composition in which the PVDF-based resins of the above-mentioned (2) (homopolymer B) and (8) (Kynar 460) were blended at a mass ratio of (2)/(8)=3/2 was used as a sheath material. Using two extruders each having a diameter of 35 mm (a complex nozzle with 36 holes each having a diameter of 2.3 mm), they were spun at a complex ratio of core material/sheath material=82/18 and an extrusion temperature of 240° C. to 310° C.

Thereafter, thus obtained product was quenched (rapidly cooled) in water at a cooling temperature of 60° C., and then was drawn to a ratio of 5.9 in a glycerin bath at 164° C. Subsequently, it was relaxed to a ratio of 0.97 in hot water at 87° C., so as to yield a thick monofilament having a diameter of 0.54 mm.

Comparative Example 1

A monofilament having a diameter of 0.30 mm was obtained in the same manner as with Example 1 except that the PVDF-based resin of the above-mentioned (3) (homopolymer C) was used as a material resin of the PVDF-based monofilament and drawn to a ratio of 5.5 in a glycerin bath at 167° C.

Comparative Example 2

A monofilament having a diameter of 0.30 mm was obtained in the same manner as with Example 1 except that the PVDF-based resin of the above-mentioned (5) (copolymer a) was used as a material resin of the PVDF-based monofilament and drawn to a ratio of 6.0 in a glycerin bath at 151° C.

Comparative Example 3

A monofilament having a diameter of 0.30 mm was obtained in the same manner as with Example 1 except that the PVDF-based resin of the above-mentioned (7) (copolymer c) was used as a material resin of the PVDF-based monofilament and drawn to a ratio of 6.1 in a glycerin bath at 136° C.

Test Evaluation

Using the methods stated in the above-mentioned measurement tests 1 to 6, the melting point (respective melting points of the core and sheath materials if the sample comprises them), knot strength, knot elongation, bend elastic constant, line kink index, and reel uncoiling degree were measured for each of the monofilaments in accordance with Examples and Comparative Examples.

Their results are shown in Tables 2 and 3 together with their compositions and diameters.

TABLE 2

|  | Core material composition | Sheath material composition | Comonomer content/% by mass | Inherent viscosity/ dl/g | Core material MP/° C. | Sheath material MP/° C. | MP difference/ ° C. |
|---|---|---|---|---|---|---|---|
| Example 1 | (6) | — | 3.8 | 1.48 | 167 | — | — |
| Example 2 | (3)/(5) = 1/1 | — | 3.1 | 1.48 | 170 | — | — |
| Example 3 | (4)/(5) = 1/1 | — | 3.1 | 1.58 | 170 | — | — |
| Example 4 | (4)/(5) = 2/1 | — | 2.0 | 1.62 | 172 | — | — |
| Example 5 | (4)/(6) = 1/1 | — | 1.9 | 1.63 | 170 | — | — |
| Example 6 | (4)/(5) = 2/1 | (2)/(8) = 4/1 | 1.5 | 1.54 | 172 | 174 | 2 |
| Example 7 | (4)/(5) = 2/1 | (2)/(8) = 3/2 | 1.5 | 1.53 | 172 | 172 | 0 |
| Example 8 | (4)/(5) = 1/1 | (2)/(8) = 2/3 | 2.5 | 1.48 | 170 | 170 | 0 |
| Example 9 | (3)/(5) = 2/1 | (1)/(8) = 3/2 | 1.5 | 1.40 | 172 | 171 | 1 |
| Example 10 | (4)/(5) = 2/1 | (2)/(8) = 3/2 | 1.5 | 1.53 | 172 | 172 | 0 |
| Comp. Ex. 1 | (3) | — | 0 | 1.50 | 175 | — | — |
| Comp. Ex. 2 | (5) | — | 6.1 | 1.45 | 161 | — | — |
| Comp. Ex. 3 | (7) | — | 9.5 | 1.00 | 150 | — | — |

TABLE 3

|  | Diameter/ mm | Knot strength/ Mpa | Knot elongation/% | Bend elastic constant/ GPa | Line kink index | Reel uncoiling |
|---|---|---|---|---|---|---|
| Example 1 | 0.30 | 598 | 28.5 | 1.14 | 0.88 | 5 |
| Example 2 | 0.30 | 628 | 27.8 | 1.21 | 0.79 | 5 |
| Example 3 | 0.30 | 633 | 27.4 | 1.20 | 0.87 | 5 |
| Example 4 | 0.30 | 634 | 28.4 | 1.17 | 0.83 | 4 |
| Example 5 | 0.30 | 659 | 27.4 | 1.18 | 0.77 | 4 |
| Example 6 | 0.30 | 670 | 22.9 | 1.18 | 0.77 | 4 |
| Example 7 | 0.30 | 676 | 24.5 | 1.17 | 0.76 | 4 |
| Example 8 | 0.30 | 670 | 24.8 | 1.15 | 0.88 | 4 |
| Example 9 | 0.12 | 753 | 20.5 | 1.86 | 0.92 | 5 |
| Example 10 | 0.54 | 570 | 24.8 | 0.50 | 0.60 | 3 |
| Comp. Ex. 1 | 0.30 | 602 | 26.5 | 1.41 | 0.67 | 1 |
| Comp. Ex. 2 | 0.30 | 546 | 32.2 | 0.89 | 0.88 | 5 |
| Comp. Ex. 3 | 0.30 | 390 | 37.6 | 0.50 | 0.92 | 5 |

As shown in the above-mentioned tables, it has been verified that the monofilaments in accordance with the present invention obtained by Examples have a sufficient knot strength as a fishing line, an appropriate knot elongation which is not too large, and a lowered bend elastic constant, which improves the softness. They have also been found to exhibit a sufficiently high line kink index, i.e., they are hard to kink upon winding, and favorably suppress uncoiling from reels. These facts clarify that the monofilaments of the present invention exhibit various characteristics of PVDF-based resins, and are excellent in suitability for reeling and quite favorable as lure lines and main lines.

Among them, it has been verified that the monofilaments of Examples 6 to 8 each having a double structure made of core and sheath materials achieve higher knot strength and lower knot elongation as compared with the monofilaments of Examples 1 to 5 each comprising a core material alone. This has proved the superiority of the monofilaments in accordance with the present invention having a core material (core part) and a sheath material (sheath part).

It has been found that, by contrast, the monofilament of Comparative Example 1 is relatively hard, easier to kink upon winding, and not sufficiently suitable for reeling, thus failing to be useful for main lines and the like, whereas the monofilaments of Comparative Examples 2 and 3 are favorable in terms of softness and resistance to kink upon winding but somewhat poor in knot strength and elongation, and thus are insufficient for use in lure lines, main lines, and the like.

INDUSTRIAL APPLICABILITY

As explained in the foregoing, the resin composition of the present invention, and the monofilament and fishing line using the same are better in softness and harder to kink upon winding as compared with conventional ones while maintaining various excellent characteristics of the PVDF-based monofilament, and can improve suitability for reeling. Also, the method of making a monofilament in accordance with the present invention can yield a monofilament and a fishing line which have various excellent characteristics of the PVDF-based monofilament, remarkably ameliorate softness and resistance to kink upon winding, and sufficiently improve suitability for reeling.

The invention claimed is:

1. A sheathless monofilament comprising a vinylidene fluoride-based resin, said monofilament including 1% to 10% by mass of a comonomer component, and having an intrinsic viscosity of at least 1.3 dl/g and a melting point of at least 165° C. wherein the knot strength of the monofilament is at least approximately 598 MPa.

2. A monofilament according to claim 1, wherein said comonomer component is derived from an alkene having a carbon number of 2 to 10 with at least one hydrogen atom substituted by a fluorine atom.

3. A monofilament according to claim 1, wherein said comonomer component is hexafluoropropylene.

4. A monofilament according to claim 1, wherein said monofilament satisfies the relationships represented by the following expressions (1) and (2):

$$F \geq \left(\frac{37}{b}\right)^{\frac{1}{3.5}} \quad (1)$$

$$E \leq \left(\frac{700}{d}\right)^{\frac{1}{3.5}} \quad (2)$$

where

F is the knot strength (GPa) of said monofilament, E is the bend elastic constant (GPa) of said monofilament, and d is the diameter (μm) of said monofilament.

5. A monofilament as recited in claim 1 wherein the knot strength of the monofilament is at least approximately 628 MPa.

6. A monofilament as recited in claim 1 wherein the bend elastic constant is at most approximately 1.2 GPa.

7. A monofilament as recited in claim 5 wherein the diameter of the filament is in the range of approximately 50 to 2500 microns.

8. A monofilament as recited in claim 1 wherein the diameter of the filament is approximately 300 microns.

9. A monofilament as recited in claim 8 wherein the knot strength of the monofilament is at least approximately 625 MPa.

10. A monofilament as recited in claim 9 wherein the bend elastic constant is at most approximately 1.27 GPa.

* * * * *